US008504906B1

(12) United States Patent
Xu (10) Patent No.: US 8,504,906 B1
(45) Date of Patent: Aug. 6, 2013

(54) SENDING SELECTED TEXT AND CORRESPONDING MEDIA CONTENT (75) Inventor: Sheng Davisson Xu, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/228,322

(22) Filed: Sep. 8, 2011

(51) Int. Cl.
G06F 17/00 (2006.01)

(52) U.S. Cl.
USPC .......................................... 715/203

(58) Field of Classification Search
USPC ................... 715/203, 204, 205, 230
See application file for complete search history.

(56) References Cited

U.S. PATENT DOCUMENTS

| | | | | |
|---|---|---|---|---|
| 6,697,944 B1 * | 2/2004 | Jones et al. | .................... | 713/168 |
| 6,886,036 B1 * | 4/2005 | Santamaki et al. | ........... | 709/223 |
| 6,940,491 B2 * | 9/2005 | Incertis Carro | ............... | 345/173 |
| 7,106,309 B2 * | 9/2006 | Wood et al. | .................... | 345/173 |
| 7,356,507 B2 * | 4/2008 | Bezos et al. | .................... | 705/40 |
| 7,712,020 B2 * | 5/2010 | Khan | ............................ | 715/205 |
| 7,974,889 B2 * | 7/2011 | Raimbeault | .................. | 705/26.7 |
| 8,027,943 B2 * | 9/2011 | Juan et al. | ........................ | 706/45 |
| 8,131,645 B2 * | 3/2012 | Lin et al. | ......................... | 705/51 |
| 8,224,727 B2 * | 7/2012 | Hirson et al. | .................... | 705/35 |
| 8,249,992 B2 * | 8/2012 | Harkness et al. | ............... | 705/59 |
| 8,270,310 B2 * | 9/2012 | Raleigh | ......................... | 370/252 |
| 8,285,598 B2 * | 10/2012 | Mesaros | ....................... | 705/26.1 |
| 2002/0075302 A1 * | 6/2002 | Simchik | ......................... | 345/745 |
| 2006/0168507 A1 * | 7/2006 | Hansen | ....................... | 715/500.1 |
| 2006/0194181 A1 * | 8/2006 | Rosenberg | .................... | 434/317 |
| 2008/0005656 A1 * | 1/2008 | Pang et al. | ................. | 715/500.1 |
| 2009/0094537 A1 * | 4/2009 | Alber | ............................ | 715/758 |
| 2009/0202226 A1 * | 8/2009 | McKay | ......................... | 386/104 |
| 2009/0254802 A1 * | 10/2009 | Campagna et al. | ........... | 715/209 |
| 2009/0276407 A1 * | 11/2009 | Van Vleet et al. | ................. | 707/3 |
| 2009/0319368 A1 * | 12/2009 | Reardon et al. | ............ | 705/14.51 |
| 2010/0315359 A1 * | 12/2010 | Seong et al. | ................... | 345/173 |
| 2011/0167390 A1 * | 7/2011 | Reed et al. | ..................... | 715/854 |
| 2011/0197159 A1 * | 8/2011 | Chaganti et al. | .............. | 715/781 |
| 2011/0271197 A1 * | 11/2011 | Jones et al. | .................... | 715/739 |
| 2011/0289421 A1 * | 11/2011 | Jordan et al. | .................. | 715/739 |
| 2012/0204107 A1 * | 8/2012 | Salinas | ......................... | 715/716 |
| 2012/0218287 A1 * | 8/2012 | McWilliams | ................. | 345/619 |
| 2012/0233565 A1 * | 9/2012 | Grant | ............................ | 715/776 |
| 2012/0236201 A1 * | 9/2012 | Larsen et al. | ................. | 348/468 |
| 2012/0254303 A1 * | 10/2012 | Anbalagan et al. | ........... | 709/204 |

* cited by examiner

Primary Examiner — Laurie Ries
(74) Attorney, Agent, or Firm — Lee & Hayes, PLLC (57) ABSTRACT A server receives a request from a first computing device to send a communication to a second computing device. The request includes data identifying text selected from an e-book. The server identifies media content, such as an audio book or a movie, that corresponds to the e-book. The server extracts a portion of the media content that corresponds to the text selected from the e-book. The server generates a communication that includes media data that enables access to the portion of the media content and sends the communication to the second computing device.

25 Claims, 10 Drawing Sheets

SENDING SELECTED TEXT AND CORRESPONDING MEDIA CONTENT

BACKGROUND

An electronic book ("e-book") is a publication in digital form consisting of text, images, or both, and readable on one or more computing devices. E-books may be read on dedicated hardware computing devices known as e-book reader devices, as well as on personal computers, laptop computers, tablet computers, wireless phones and other display-based electronic devices.

E-books may be published in different formats, including plain text, portable document format (PDF), hypertext markup language (HTML), mobipocket, eReader, postscript, and the like. In some cases, a digital rights management (DRM) encoding may be used in conjunction with a particular e-book format to prevent unauthorized usage or distribution of protected content. For example, a particular publisher may use a proprietary DRM encoding in conjunction with a publishing format to create a proprietary e-book format.

People often like to share information with other people. For example, people often share information that they have read with family, friends, colleagues, or other people through verbal and/or written communication. Sometimes, people like to quote things they read, such as a sentence, several lines, or even a few paragraphs in a document.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes architectures and techniques to enable sharing selected text from an e-book and corresponding media content. In particular, a first computing device may enable an individual (e.g., a sender) to view an e-book. The first computing device may enable the sender to select a portion of the e-book (e.g., selected text) and instruct a server to send the selected text and/or corresponding media content to one or more recipients.

The media content may be a portion of an audio file, a video file, or other media content that corresponds to the selected text. For example, the e-book may have a corresponding audio book that includes a recording of text from the e-book being spoken (e.g., read out loud) by a human being. In some instances, the audio book may include audio of someone associated with the book, such as the author or a literary scholar, speaking the text from the e-book. As another example, the e-book may have a corresponding video file (e.g., a movie) that includes dialog spoken by actors. The dialog from the video file may correspond to text from the e-book.

The first computing device may enable the sender to include annotations, a greeting, or both along with the selected text. The annotations and the greeting may be in a text-format, an audio format, a picture format (e.g., a picture of handwritten notes captured by the first computing device), another format, or any combination thereof.

A server may receive the request from the first computing device. The server may identify media content (e.g., an audio book or a movie) that corresponds to the e-book and select a portion of the media content that corresponds to the selected text. For example, the server may use speech recognition to select a portion of the media content that corresponds to the text selected from the e-book by the sender.

The server may send a communication to one or more computing devices associated with recipients specified by the sender. For example, the sender may provide to the server an address (e.g., an email address, a phone number, a user name, an alias, a text message address, and the like) associated with each of the recipients. The communication may enable the recipients to access one or more of the selected text, the corresponding portion of the media content, the annotation data, or the greeting. One or more of the selected text, the corresponding portion of the media content, the annotation data, or the greeting may be stored at the server. The communication may provide hyperlinks to enable the recipients to access those items that are stored in the server. One or more of the selected text, the corresponding portion of the media content, the annotation data, or the greeting may be stored in the communication (e.g., instead of the server) for output via the computing device associated with the recipient. The communication may also enable each recipient to acquire the e-book, the corresponding media content, the corresponding book, other items (e.g., books, e-books, audio books, movies, multimedia content, and the like) that are associated with the e-book, or any combination thereof. For example, the communication may enable the recipients to acquire items (e.g., books, e-books, audio books, media content, or movies) that are authored by the author of the e-book that includes the selected text.

Accordingly, the frameworks, architectures, and techniques described herein provide a flexible and automated system to enable an individual to send a communication to one or more recipients. The communication may include text selected from an e-book and/or a portion of media content corresponding to the selected text. The communication may include annotations to the selected text, a greeting, or both. The communication may enable the recipients to acquire the e-book, the corresponding media content, other related items, or any combination thereof.

Example Framework

Figure 1:
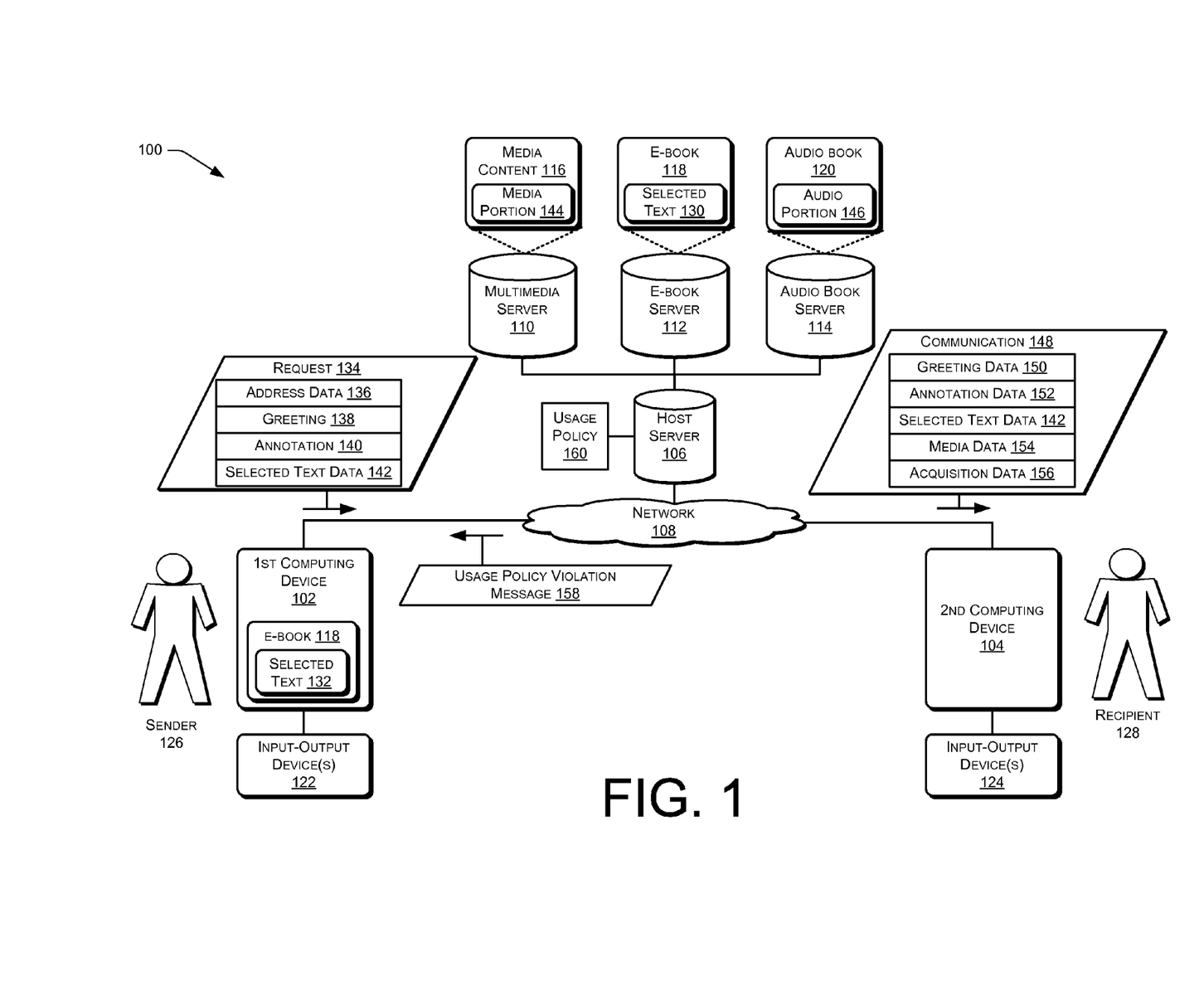
FIG. 1 illustrates an example framework to enable sharing selected text and corresponding media content.

FIG. 1 illustrates an example framework 100 to enable sharing selected text and corresponding media content. The framework 100 includes multiple devices, such as a first computing device 102 and a second computing device 104, that are coupled to a host server 106 via a network 108. The host server 106 may include multiple servers, such as a multimedia server 110, an e-book server 112 and an audio book server 114. For example, the multimedia server 110 may host multiple media content items, such as media content 116. The e-book server 112 may host multiple e-books, such as an e-book 118. The audio book server 114 may host multiple audio books, such as an audio book 120. The host server 106 may provide items, such as tangible goods, digital downloads, service offerings, and the like, for acquisition (e.g., purchase, rental, or subscription). The items available via the host server 106 may be provided by one or more merchants.

The network 108 may include multiple networks that use a variety of technologies, such as wireless technologies (e.g., global system for mobile (GSM), code division multiple access (CDMA), universal mobile telephone service (UMTS), WiMax®, and the like), wireline technologies (e.g., public switched telephone network (PSTN), digital subscriber line (DSL), synchronous optical network (SONET), and the like), other types of communications technologies, or any combination thereof.

Each of the multiple computing devices, such as the computing devices 102 and 104, may include devices, such as input devices and output devices. For example, the first computing device 102 may include one or more input-output devices 122. The second computing device 104 may include one or more input-output devices 124. For example, each of the input-output devices 122 and 124 may include one or more of a keypad, a microphone, a speaker, a joystick, navigation buttons, other types of input-output devices or any combination thereof.

Each of the multiple computing devices may be associated with one or more individuals. For example, a sender 126 may be associated with the first computing device 102 and a recipient 128 may be associated with the second computing device 104. The sender 126 may view an e-book, such as the e-book 130 via the first computing device 102. The sender 126 may select a portion of the text from the e-book 130 to create the selected text 132. The sender 126 may desire to send the selected text 132 to one or more recipients, such as the recipient 128.

The sender 126 may create a request 134 for the host server 106. The request 134 may include one or more of address data 136, a greeting 138, an annotation 140, and/or selected text data 142. The address data 136 may identify one or more recipients of the selected text 132. For example, the address data 136 may include an email address of at least one recipient, a phone number of at least one recipient, a text message address of at least one recipient, another type of address of at least one recipient, or any combination thereof. The address data 136 may also include identifiers that link to addresses, such as usernames or aliases. The greeting 138 may be created by the sender 126 and may include a text-based greeting, an audio-based greeting (e.g., words spoken by the sender 126), or both. The annotation 140 may be created by the sender 126 and may include an audio-based annotation, text-based annotation data, graphics-based data, or any combination thereof. The selected text data 142 may be associated with the selected text 132. For example, the selected text data 142 may be a pointer or other data (e.g., page number, paragraph number, and the like) that uniquely identifies the selected text 132.

The host server 106 may receive the request 134 from the first computing device 102 via the network 108. In response to receiving the request 134, the host server 106 may identify one or more of the audio book 120, the media content 116, or other content hosted by the host server 106 that corresponds to the e-book 118. For example, the e-book 118 may be a particular title written by a particular author and the audio book 120 may include audio data that corresponds to text of the particular title spoken (e.g., read out loud) by a human, such as the particular author or someone associated with the particular author (e.g., a literary scholar who has studied the author). The host server 106 may identify an audio portion 146 of the audio book 120 that corresponds to the selected text 130 from the e-book 118. The host server 106 may identify a media portion 144 of the media content 116 that corresponds to the selected text 130 from the e-book 118.

In some implementations, the sender 126 may specify in the request 134 whether the host server 106 is to identify the audio portion 146 or the media portion 144. In other implementations, the host server 106 may attempt to identify the audio book 120. In response to determining that there is no corresponding audio book to the e-book 118, the host server 106 may attempt to identify the media content 116 corresponding to the e-book 118. In some implementations, if there is no corresponding audio book 120 or media content 116 that corresponds to the e-book 118, the host server 106 may generate an audio portion corresponding to the selected text 130 using a text-to-speech synthesizer.

The host server 106 may send a communication 148 to each of the recipients, such as the recipient 128, based on the address data 136. The communication 148 may include greeting data 150, annotation data 152, the selected text data 142, media data 154, acquisition data 156, other types of data or any combination thereof. One or more of the greeting data 138 or the annotation 140 may be stored at the host server 106 and the greeting data 150 or the annotation data 152 may be hyperlinks to enable access to the greeting 138 and the annotation 140, respectively. In some instances, the greeting data 150 may include the greeting 138, the annotation data 152 may include the annotation 140, or both. In some implementations, the media data 154 may include a hyperlink to access the audio portion 146, the media portion 144, or audio generated using the text-to-speech synthesizer. In other implementations, the media data 154 may include the audio portion 146, the media portion 144, or the audio generated using the text-to-speech synthesizer. The acquisition data 156 may enable the recipient 128 to acquire the e-book 118, the corresponding audio book 120, the media content 116, other content related to the e-book 118 or any combination thereof. For example, the acquisition data 156 may enable the recipient 128 to acquire books, e-books, media content, or audio books authored by the author of the e-book 118.

Each of the recipients may receive the communication 148 via a computing device. For example, in FIG. 1, the recipient 128 may receive the communication 148 via the second computing device 104. In response, the recipient 128 may access the greeting data 150, the annotation data 152, the selected text data 142, the media data 154 or the acquisition data 156 or any combination thereof. For example, the recipient 128 may view or listen to the greeting 138 via the greeting data 150. The recipient 128 may view or listen to the annotation 140 via the annotation data 152. The recipient 128 may view the selected text data 142. The recipient may initiate playback of the media portion 144 or the audio portion 146 via the media data 154. The recipient 128 may acquire one or more of the e-book 118, the media content 116, or the audio book 120 via the acquisition data 156.

In some implementations, the host server 106 may determine whether sending the communication 148 would violate a usage policy 160. For example, the usage policy 160 may include one or more policies regarding sharing the selected text 132. To illustrate, the usage policy 160 may specify that the selected text 132 may not exceed a particular number of words or characters. The usage policy 160 may specify that no more than a particular number of selections from the e-book 118 may be shared. Of course, other types of usage limitations may be specified by the usage policy 160. In response to determining that the request 134 violates the usage policy 160, the host server 106 may not send the communication 148. Instead, the host server 106 may send a usage policy violation message 158 to the sender 126.

Thus, the sender 126 may instruct the host server 106 to send the communication 148 to the recipient 128. The communication 148 may include the selected text 132 and either the audio portion 146 or the media portion 144 that correspond to the selected text 130. Based on the capabilities of the second computing device 104, the recipient may view the selected text 132 or initiate playback of the media portion 144 of the media content 116 or the audio portion 146 of the audio book 120. For example, when the second computing device 104 is a wireless phone or other device that has a relatively small display, the recipient 128 may listen to the audio portion 146 of the audio book 120 rather than viewing the selected text 132.

User Interfaces

Figure 2:
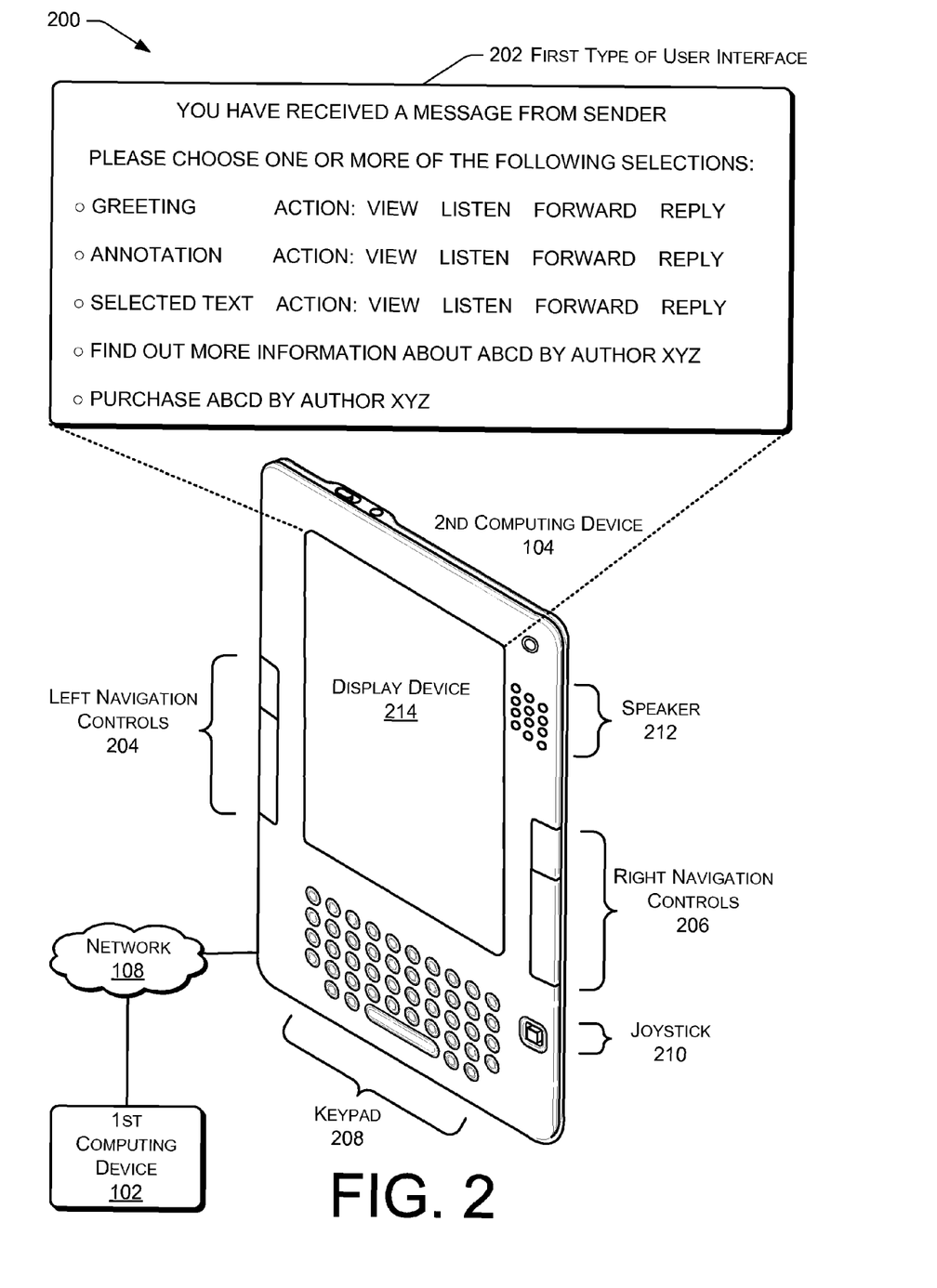
FIG. 2 illustrates an example framework including a first type of user interface provided by a computing device of a recipient.

FIG. 2 illustrates an example framework 200 that includes a first type of user interface 202 provided by a computing device that is associated with a recipient. The framework 200 includes the first computing device 102 coupled to the second computing device 104 via the network 108. In FIG. 2, the second computing device 104 is depicted as a tablet computing device, such as an e-book reader device, that provides the first type of user interface 202.

The second computing device 104 may include one or more input devices, such as left navigation controls 204, right navigation controls 206, a keypad 208, a joystick 210, a microphone, another type of input device or any combination thereof. The second computing device 104 may include output devices, such as a speaker 212, a display device 214, another type of output device or any combination thereof.

The first type of user interface 202 may enable the recipient to perform various actions. For example, the first type of user interface 202 may enable the recipient to choose one or more selections, such as viewing, listening to, forwarding, or replying to a greeting (e.g., the greeting 138 of FIG. 1), an annotation (e.g., the annotation 140), or selected text (e.g., the selected text 132). The recipient may view a greeting that is text-based or listen to a greeting that is audio-based. The recipient may view an annotation that is text-based or listen to an annotation that is audio-based. The recipient may view a portion (e.g., the media portion 144) of media content corresponding to the selected text. The recipient may listen to a portion (e.g., the audio portion 146) of an audio book corresponding to the selected text.

The first type of user interface 202 may enable the recipient to instruct the host server 106 of FIG. 1 to forward the message to additional individuals. The host server 106 may determine whether to forward the message based on the usage policy (e.g., the usage policy 160 of FIG. 1). The recipient may also reply to the sender and the reply may include a greeting, an annotation or selected text from an e-book (e.g., the e-book 118 or another e-book different from the e-book 118). The first type of user interface 202 may enable the recipient to find out more information about the author of the e-book or additional information associated with the selected text. For example, the first type of user interface 202 may enable the recipient to select a hyperlink to enable the second computing device 104 to access a host site that provides additional information associated with the e-book.

Figure 3:
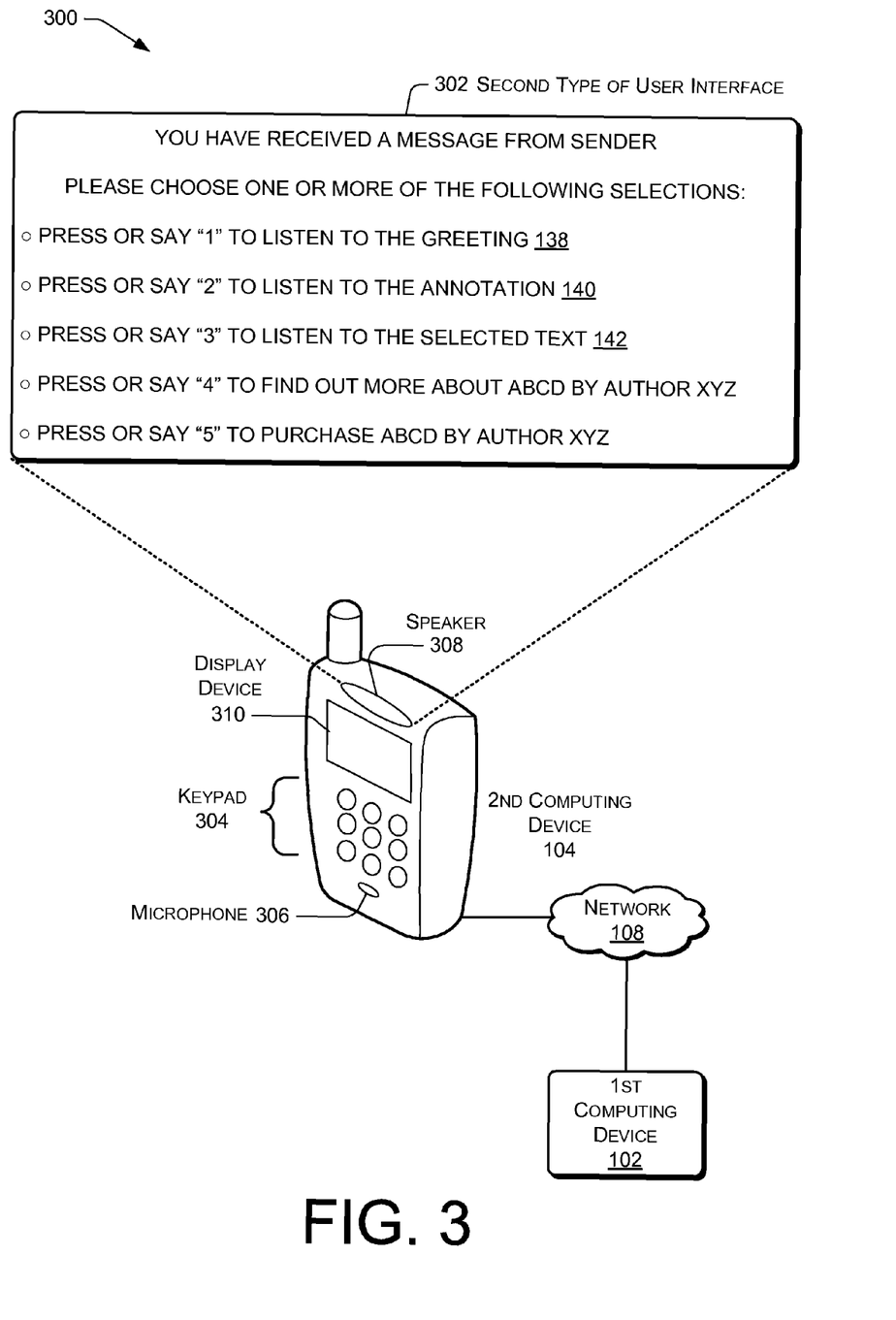
FIG. 3 illustrates an example framework including a second type of user interface provided by a computing device of a recipient.

FIG. 3 illustrates an example framework 300 that includes a second type of user interface 302 provided by a computing device that is associated with a recipient. The framework 300 includes the first computing device 102 coupled to the second computing device 104 via the network 108. In FIG. 3, the second computing device 104 is depicted as a wireless phone that provides the second type of user interface 302.

The second computing device 104 may include one or more input devices, such as a keypad 304, a microphone 306, another type of input device or any combination thereof. The second computing device 104 may include output devices, such as a speaker 308, a display device 310, another type of output device, or any combination thereof.

The second type of user interface 302 may enable navigation via a keypad or via spoken voice commands. The second type of user interface 302 may enable the recipient to perform various actions. For example, the user interface 302 may enable the recipient to choose one or more of selections, such as viewing, listening to, forwarding, or replying to a greeting (e.g., the greeting 138 of FIG. 1), an annotation (e.g., the annotation 140), or selected text (e.g., the selected text 132). For example, the recipient may listen to a greeting that is audio-based. The recipient may listen to an annotation that is audio-based. The user interface 302 may enable the recipient to find out more information about the e-book or initiate acquiring the e-book.

Social Networking Site

Figure 4:
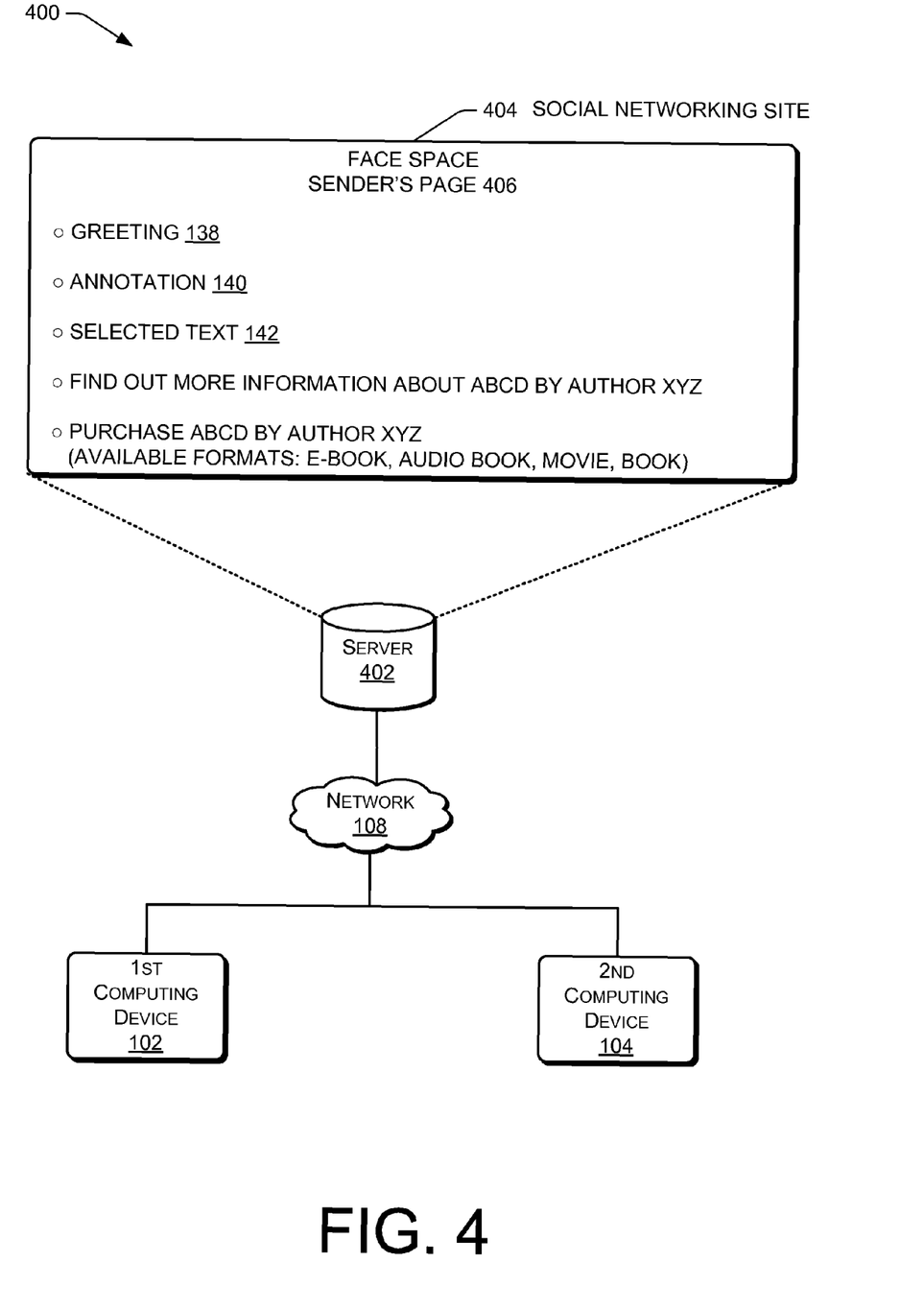
FIG. 4 illustrates an example framework including a social networking site accessed by a computing device of a recipient.

FIG. 4 illustrates an example framework 400 including a social networking site accessed by a computing device of a recipient. A server 402 that is coupled to the network 108 may host a social networking site 404.

An address of the social networking site 404 may be included in the address data 136 of FIG. 1 to enable the social networking site 404 to receive the communication 148. In response to receiving the communication 148, the social networking site 404 may post the communication 148 on the social networking site 402. To illustrate, the social networking site 404 may include a sender's page 406 that is associated with the sender 126. The contents of the communication 148 may be posted at the sender's page 406 on the social networking site 404. For example, the social networking site 404 may post one or more of the greeting 138, the annotation 140, the selected text 142, other information, hyperlinks, or any combination thereof. The hyperlinks may be used by viewers of the sender's page 406 to access information about the e-book 118, the author of the e-book, other information, or any combination thereof. The sender's page 406 may also include information enabling a viewer of the sender's page 406 to acquire the e-book 118, the corresponding audio book 120, the corresponding media content 116, or any combination thereof.

Example Architecture

Figure 5:
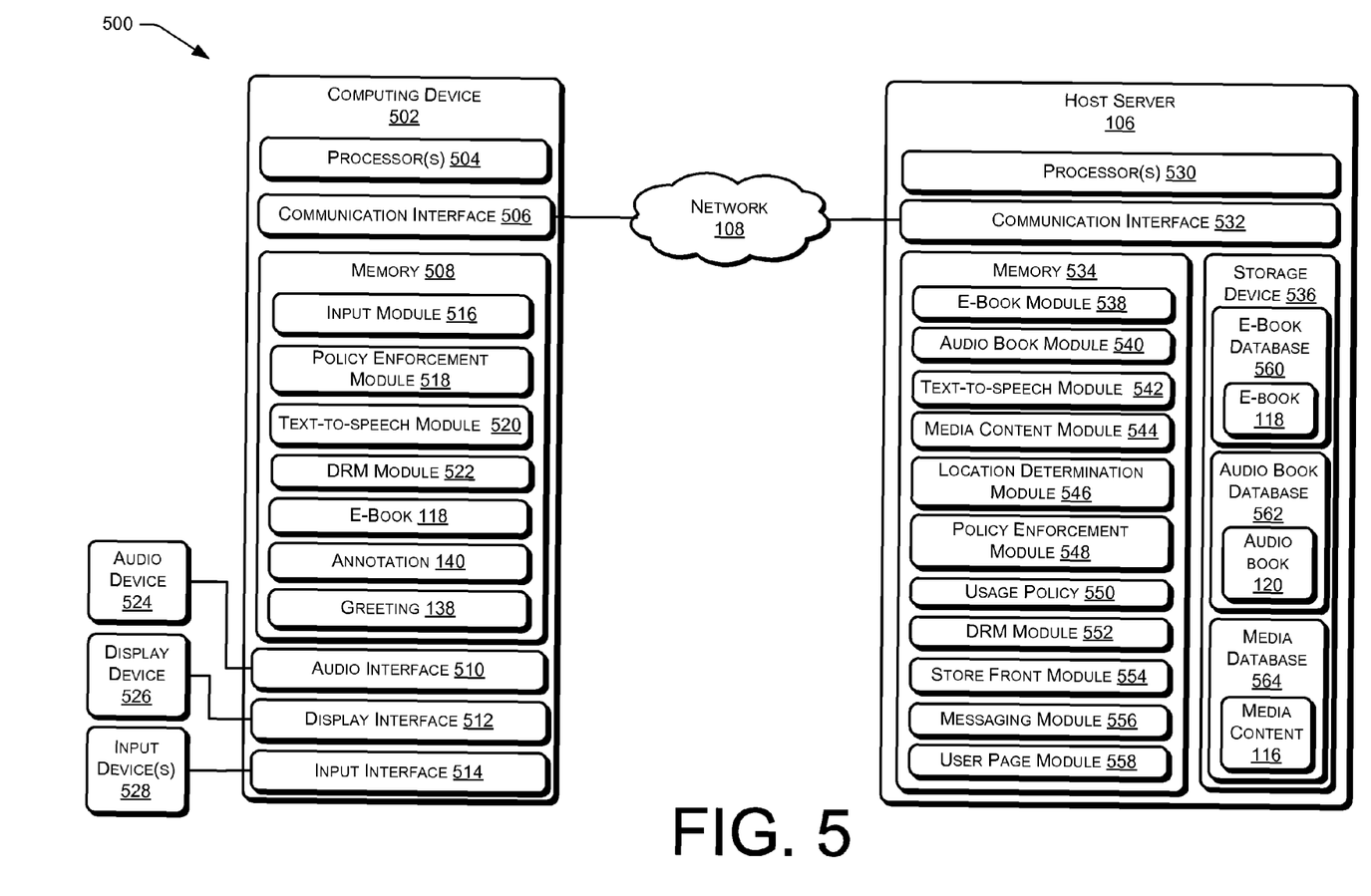
FIG. 5 illustrates an example architecture to enable sharing selected text and corresponding media content.

FIG. 5 illustrates an architecture 500 to enable sharing selected text and corresponding media content. The architecture 500 includes a computing device 502 coupled to the host server 106 via the network 108. The computing device 502 illustrates an example of a computing device that may be used by a sender (e.g., the first computing device 102 of FIG. 1), a recipient (e.g., the second computing device 104), or both.

The computing device 502 may include a processor 504, a communication interface 506, a memory 508, an audio interface 510, a display interface 512 and an input interface 514.

The memory 508 may include an input module 516, a policy enforcement module 518, a text-to-speech module 520, a digital rights management (DRM) module 522, the e-book 118, the annotation 140, and the greeting 138. An audio device 524 may be coupled to the audio interface 510, a display device 526 may be coupled to the display interface 512, and one or more input devices 528 may be coupled to the input interface 514. The input module 516 may be operable to receive input, such as the greeting 138 and the annotation 140. The input module 516 may store the input, such as the greeting 138 and the annotation 140, in the memory 508.

The policy enforcement module 518 may enforce one or more policies associated with sharing the selected text 132. For example, prior to enabling the sender 126 to send the request 134, the policy enforcement module may determine whether the size of the selected text 132 satisfies a first threshold. To illustrate, the policy enforcement module 518 may prevent the sender 126 from sending too large a portion of text. As another example, the policy enforcement module 518 may determine how many portions of the e-book 118 the sender 126 has sent to one or more recipients. The policy enforcement module 518 may determine whether the number of portions that have been sent violates one or more policies. For example, the policies may enable the first computing device 102 to prevent the unauthorized sharing of the selected text 132. The policy enforcement module 518 may enforce various policies such as how many times a sender 126 may send the selected text 132 to a particular recipient, how many portions of the selected text 132 may be selected from the e-book 118 to be communicated to other recipients, etc.

The text-to-speech module 520 may be operable to read aloud one or more of the selected texts 132, the greeting 138, the annotation 140 at the second computing device 104. The DRM module 522 may enforce a digital rights management scheme. For example, the DRM module 522 may be operable to decode one or more digital rights management coding schemes used to encode e-books, such as the e-book 118.

The audio device 524 may be a speaker or a headphone jack to enable a user to listen to audio. The display device 526 may be a liquid crystal display, a light-emitting dial display, other type of display or any combination thereof. The input device 528 may include a keypad, a mouse, navigation controls, a joystick, other input devices or any combination thereof.

The host server 106 may include one or more processors 530, a communication interface 532, a memory 534 and a storage device 536. The memory 534 may include an e-book module 538, an audio book module 540, a text-to-speech module 542, a media content module 544, a location determination module 546, a policy enforcement module 548, a usage policy 550, a DRM module 552, a storefront module 554, a messaging module 556 and a user page module 558. The e-book module 538 may be operable to identify the e-book 118 associated with the selected text 132 based on the selected text data 142. The audio book module 540 may be operable to identify the audio book 120 that corresponds to the e-book 118. The text-to-speech module 542 may be operable to convert the selected text 130 to audio when there is no corresponding audio book 120 corresponding to the e-book 118. The media content module 544 may be operable to identify the media content 116 that corresponds to the e-book 118.

The location determination module 546 may be operable to identify the audio portion 146 that corresponds to the selected text 130 or to identify the media portion 144 of the media content 116. For example, the location determination module 546 may use speech recognition to identify that the audio portion 146 or the media portion 144 corresponds to the selected text 130 of the e-book 118. To illustrate, the selected text data 142 may include data identifying a particular portion of the e-book 118, such as a chapter or a page number, paragraph number(s) in the chapter or the page, and sentence(s) of the paragraph(s). Based on the selected text data 142, the location determination module 546 may identify a segment of the audio book 120. For example, the location determination module 546 may identify a segment of the audio book 120 that corresponds to the chapter or page number that includes the selected text 132. The location determination module 546 may use speech recognition to identify the audio portion 146 from the segment of the audio book 120.

The policy enforcement module 548 may be operable to enforce one or more policies associated with sharing selected text and the associated media content with one or more recipients. For example, the policy enforcement module 548 may enforce various policies such as how many portions of the e-book 118 the sender 126 may share with one or more recipients, how many recipients the sender 126 may send the selected text 132 to, how many portions of the e-book 118 the sender 126 may send, other policies or any combination thereof. The usage policy 550 may provide one or more policies that the policy enforcement module 548 enforces. In some implementations, the policy enforcement module 518 may enforce the usage policy 550 at the computing device 502. In other implementations, the policy enforcement module 548 may enforce the usage policy 550 at the host server 106. In still other implementations, a combination of the policy enforcement module 518 and the policy enforcement module 548 may enforce the usage policy 550.

The DRM module 552 may be capable of encoding one or more e-book formats using a digital rights management encoding. The storefront module 554 may be operable to provide a storefront site to enable the one or more recipients to acquire the e-book 118, the audio book 120, the media content 116 or any combination thereof. The messaging module 556 may be operable to generate and send the communication 148 to one or more recipients, such as the recipient 128 or the social networking site 404 of FIG. 4. The user page module 558 may be operable to display a user page that individuals can post selected texts from multiple e-books, as described further in FIG. 6.

Favorite Quotations Page on a Host Site

Figure 6:
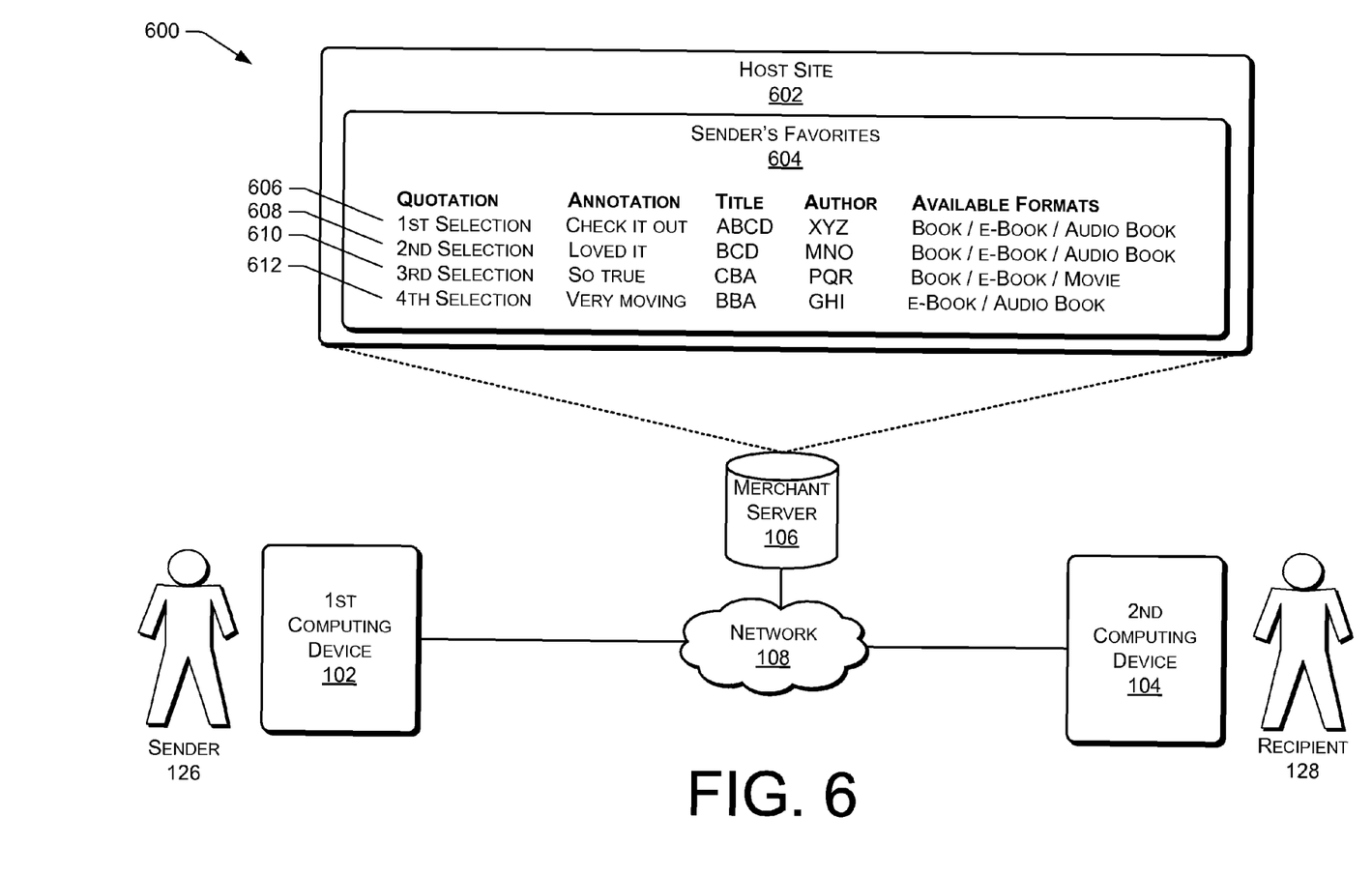
FIG. 6 illustrates an example framework to display a host site that hosts a favorites page that includes text selected by individuals.

FIG. 6 illustrates an example framework 600 to display a site that hosts a favorites page that includes text selected by individuals. For example, the framework 600 may display a host site 602 that includes pages for one or more individuals. For example, the sender 126 may have one or more pages on the host site 602 on which the sender 126 may display sender's favorites 604.

The sender's favorites 604 may include one or more selections from various e-books such as a first selection 606, a second selection 608, a third selection 610 and a fourth selection 612. Each of the selections 606, 608, 610 and 612 may include one or more of a greeting, an annotation, information associated with the particular e-book from which the quotation was selected, other information, or any combination thereof. The host website 602 may display the available formats for acquiring the source of the quotations 606, 608, 610, and 612. For example, the available formats may include book (e.g., paper-based), e-book, audio book, movie, other types of media content or any combination thereof.

Example Processes

FIGS. 7-10 show processes that may be performed to enable individuals to pre-purchase deals. Processes 700, 800, 900, and 1000 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The operations described in FIGS. 7-10 may be performed by one or more of the components shown in FIGS. 1-6, such as the computing device 102, the computing device 104, the computing device 502, the servers 106, 110, 112, 114, 402, other computing devices, or a combination thereof.

Figure 7:
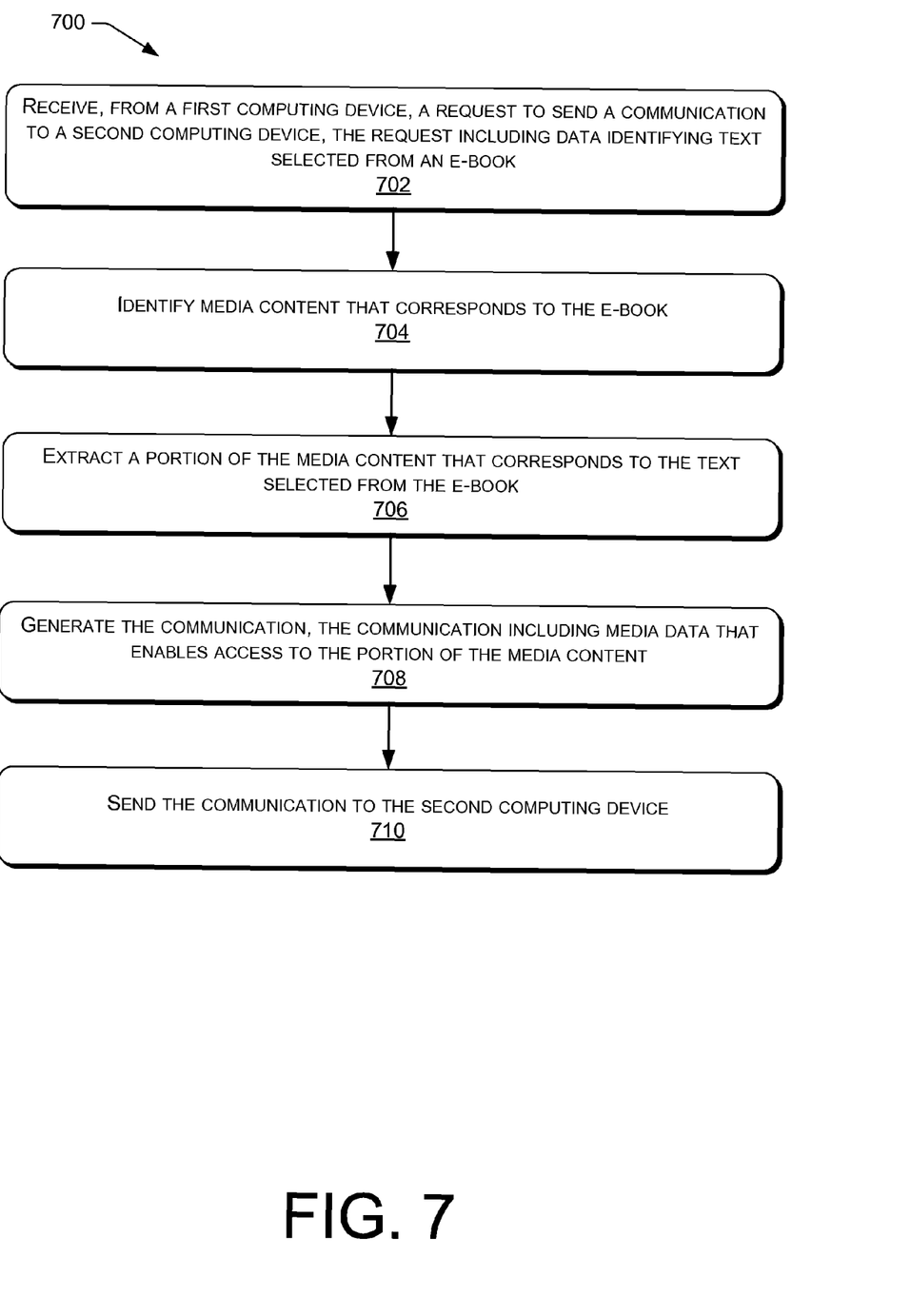
FIG. 7 is a flow diagram of a process to share selected text and corresponding media content.

FIG. 7 is a flow diagram of a process 700 from the standpoint of a server to share selected text and corresponding media content. At 702, a request to send a communication to a second computing device may be received from a first computing device. The request may include data identifying text selected from an e-book. At 704, media content that corresponds to the e-book may be identified. For example, in FIG. 1, the host server 106 may receive the request 134 and identify the audio book 120 or the media content 116 that corresponds to the e-book 118.

At 706, a portion of media content that corresponds to the text selected from the e-book may be extracted. For example, in FIG. 1, the host server 106 may extract the audio portion 146 from the audio book 120 that corresponds to the selected text 130. The host server 106 may extract the media portion 144 from the media content 116 that corresponds to the selected text 130. In some embodiments, the extraction may include selecting one or more associated files from a collection of files or selecting a portion from within a file by clipping portion from the file.

At 708, a communication may be generated that includes media data that enables access to the portion of the media content. At 710, the communication may be sent to the second computing device. For example, in FIG. 1, the host server 106 may generate the communication 148 and send the communication 148 to one or more recipients such as the recipient 128 via the computing devices associated with recipients such as the second computing device 104.

Figure 8:
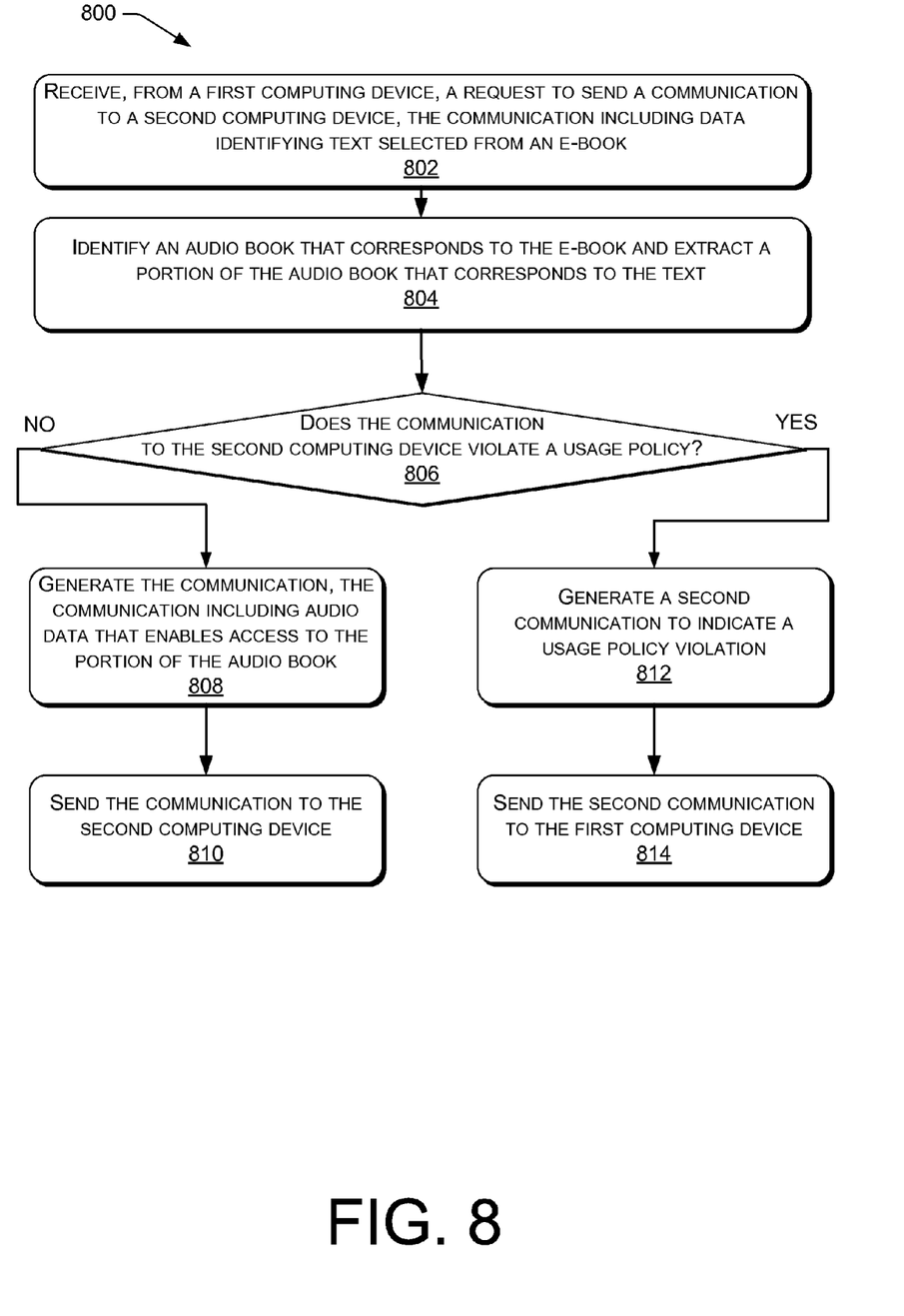
FIG. 8 is a flow diagram of another process to share selected text and corresponding media content.

FIG. 8 is a flow diagram of a process 800 from the standpoint of a server to share selected text and/or corresponding media content. At 802, a request may be received from a first computing device that requests transmission of content via a communication to be delivered to a second computing device. The communication may include data identifying text selected from an e-book. For example, in FIG. 1, the host server 106 may receive the request 134 to send the communication 148 to one or more recipients.

At 804, an audio book that corresponds to the e-book may be identified and a portion of the audio book that corresponds to the text may be extracted based on the location. For example, in FIG. 1, the host server 106 may identify the audio portion 146 of the audio book 120 that corresponds to the selected text 130 from the e-book 118. For example, in FIG. 1, the host server 106 may extract the audio portion 146 from the audio book 120 that corresponds to the selected text 130. The host server 106 may extract the media portion 144 from the media content 116 that corresponds to the selected text 130. In some embodiments, the extraction may include selecting one or more associated files from a collection of files or selecting a portion from within a file by clipping portion from the file.

At 806, a determination may be made whether the communication to the second computing device violates a usage policy. At 806, if a determination is made that the communication to the second computing device does not violate a usage policy, then the communication that includes audio that enables access to the portion of the audio book is generated at 808. At 810, the communication is sent to the second computing. For example, in FIG. 1, the host server 106 may send the communication 148 after determining that sending the communication 148 does not violate a usage policy.

At 806, if a determination is made that the communication to the second computing device violates a usage policy, then a second communication is generated to indicate a usage policy violation at 812. At 814, the second communication is sent to the first computing device. For example, in FIG. 1, the host server 106 may send the usage policy violation message 158 to the sender 126 after determining that sending the communication 148 violates the usage policy.

Figure 9:
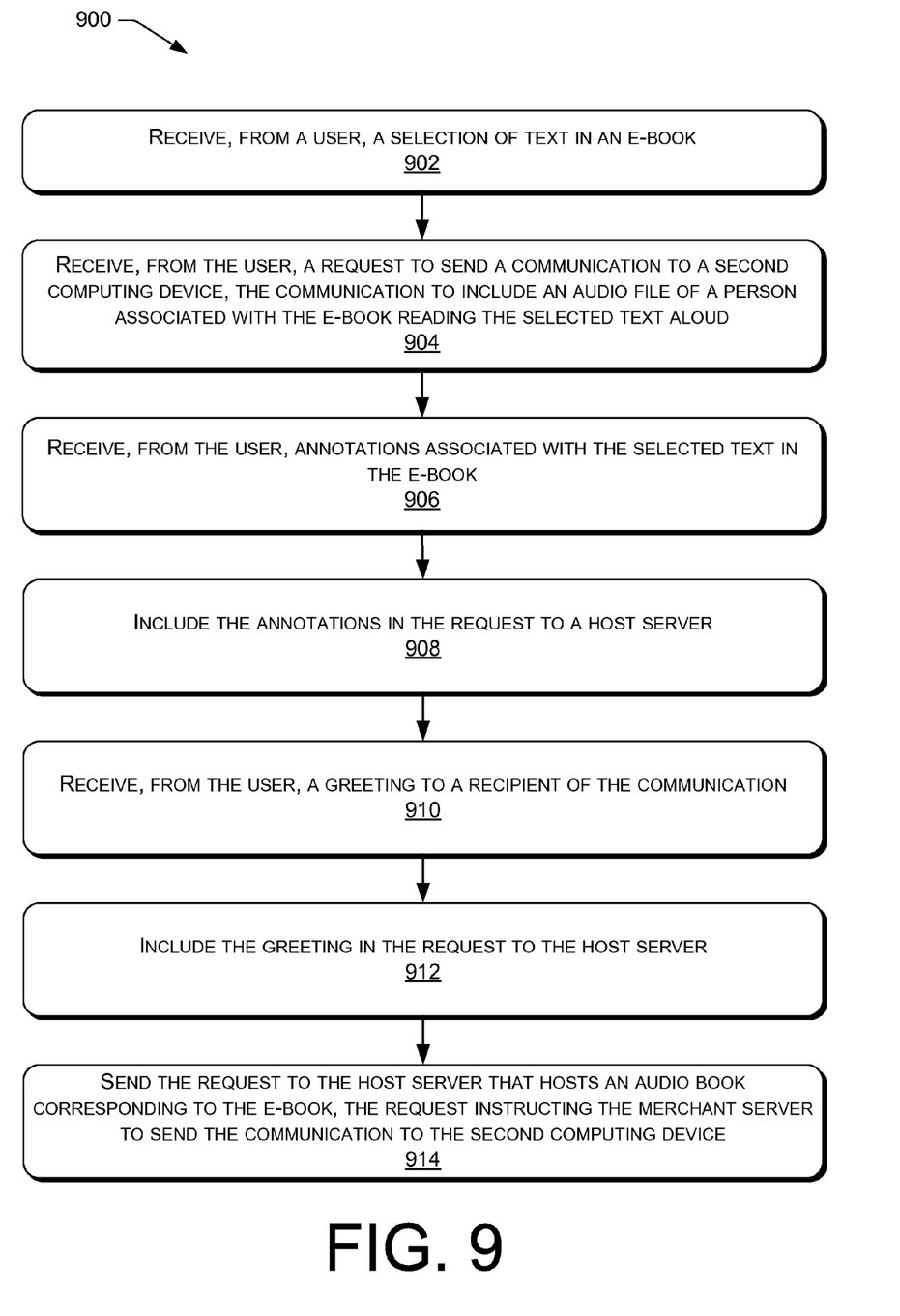
FIG. 9 is a flow diagram of a process that initiates sharing selected text and corresponding media content.

FIG. 9 is a flow diagram of a process 900 from the standpoint of a computing device to initiate sharing selected text and corresponding media content. For example, the process 900 may be performed by the first computing device 102.

At 902, a selection of text in an e-book is received from a user. At 904, a request to send a communication to a second computing device is received from the user. The communication may include media data that enables access to a portion of media content corresponding to the selected text from the e-book. At 906, annotations associated with the selected text in the e-book are received from the user. At 908, the annotations are included in the request to the host server. At 910, a greeting is received from the user. The greeting is intended for a recipient of the communication. At 912, the greeting is included in the request to the host server. For example, in FIG. 1, the first computing device 102 may receive input from the sender 126 that identifies the selected text 132 in the e-book 118. The first computing device 102 may receive one or more of the greeting 138 or the annotation 140 from the sender 126.

At 914, the request is sent to a host server that hosts an audio book corresponding to the e-book. The request may instruct the host server to send the communication to the second computing device. For example, in FIG. 1, The first computing device 102 may receive an instruction from the sender 126 to send the request 134 to the host server 106. The request 134 may instruct the host server 106 to send the communication 148 to one or more recipients, such as the recipient 128.

Figure 10:
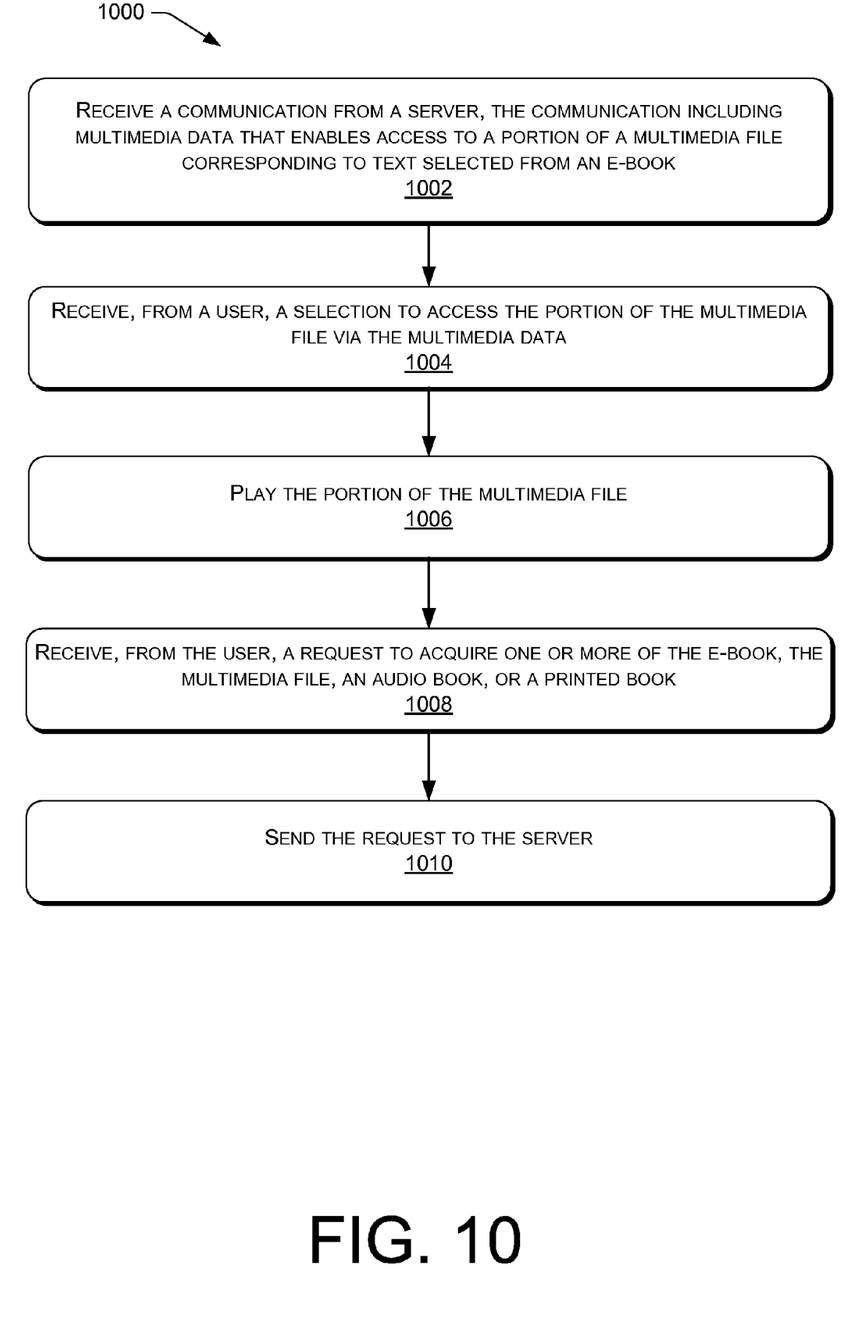
FIG. 10 is a flow diagram of a process that receives selected text and corresponding media content.

FIG. 10 is a flow diagram of a process 1000 from the standpoint of a computing device that receives selected text and corresponding media content. For example, the process 1000 may be performed by the second computing device 104.

At 1002, a communication is received from a server. The communication may include multimedia data that enables access to a portion of a multimedia file corresponding to text selected from an e-book. For example, in FIG. 1, the recipient 128 may receive the communication 148 from the host server 106 via the network 108. The communication 148 may include the greeting data 150 that enables the recipient 128 to access the greeting 138. The communication 148 may include the annotation data 152 that enables the recipient 128 to access the annotation 140. The communication 148 may include the selected text data 142 that enables the recipient 128 to access the selected text 132. The communication 148 may include the media data 154 that enables the recipient 128 to access one or more of the media portion 144 of the media content 116 or the audio portion 146 of the audio book 120.

At 1004, a selection is received from a user. The selection may be to access the portion of the multimedia file via the multimedia data. At 1006, the portion of the audio book is accessed. At 1008, the portion of the multimedia file is played. For example, in FIG. 1, the recipient 128 may, via the media data 154, access one or more of the media portion 144 or the audio portion 146.

At 1008, a request to acquire one or more of the e-book, the multimedia file, an audio book, or a printed book is received from the user. At 1010, the request is sent to the server. For example, in FIG. 1, the recipient 128 may send a request to the host server 106 to acquire one or more of the e-book 118, the media content 116, the audio book 120, another multimedia file associated with the e-book 118, or any combination thereof. In response to the request, the host server 106 may enable acquisition of one or more of the e-book, the multimedia file, or the audio book via a digital download.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   receiving, from a first computing device, a request to send a communication to a second computing device, the request including data identifying text selected from an e-book;
   identifying an audio book that corresponds to the e-book, the audio book including an audio recording of content read by a human;
   extracting a portion of the audio book that corresponds to the text selected from the e-book;
   generating the communication, the communication including:
      audio data that enables access to the portion of the audio book, and
      an acquisition hyperlink to enable acquisition of one or more of the e-book or the audio book; and
   sending the communication to the second computing device, in response to determining that the communication complies with a usage policy.

2. The method of claim 1, wherein the request to send the communication to the second computing device includes annotation data comprising annotations associated with the text selected from the e-book.

3. The method of claim 1, wherein extracting the portion of the audio book that corresponds to the text selected from the e-book comprises:
   identifying a starting location and an ending location of the text selected from the e-book;
   identifying a segment of the audio book that corresponds to the starting location and the ending location of the text selected from the e-book; and
   creating an audio file that includes the identified segment.

4. The method of claim 1, wherein the acquisition hyperlink further enables acquisition of a printed book that corresponds to the e-book.

5. The method of claim 1, wherein the acquisition hyperlink enables access to information associated with one or more of the e-book, the audio book, or a printed book.

6. A server comprising:
   one or more processors; and
   a memory including:
      a communication interface stored in the memory and executable by the one or more processors to receive, from a first computing device, a request to send a communication to a second computing device, the communication including data identifying text selected from an e-book;
      a media module stored in the memory and executable by the one or more processors to identify media content that corresponds to the e-book and to extract a portion of the media content that corresponds to the text selected from the e-book; and
      a messaging module stored in the memory and executable by the one or more processors to:
         generate the communication that includes media data that enables access to the portion of the media content and an acquisition hyperlink to enable acquisition of the e-book and items associated with the e-book, and
         send the communication to the second computing device.

7. The server of claim 6, further comprising a policy enforcement module stored in the memory and executable by the one or more processors to determine whether sending the communication to the second computing device violates a usage policy.

8. The server of claim 7, wherein the messaging module sends the communication to the second computing device in response to the policy enforcement module determining that sending the communication to the second computing device does not violate the usage policy.

9. The server of claim 7, wherein, in response to the policy enforcement module determining that sending the communication to the second computing device violates the usage policy, the messaging module is operable to generate a second communication to indicate a usage policy violation and to send the communication to the first computing device.

10. The server of claim 6, wherein the messaging module is operable to generate a text-based menu to access contents of the communication.

11. The server of claim 6, wherein the messaging module is operable to generate an audio-based menu to access contents of the communication.

12. The server of claim 6, further comprising a storefront module stored in the memory and executable by the one or more processors to enable, using the acquisition hyperlink, acquisition of one or more of the e-book, the audio book, the media content, a printed book corresponding to the e-book, or a multimedia file corresponding to the e-book.

13. The server of claim 6, wherein the items associated with the e-book include one or more of an audio book, media content, a multimedia file, or a printed book.

14. The server of claim 6, wherein the second computing device hosts a social networking website and wherein, in response to receiving the communication, the second computing device posts at least some of the contents of the communication on a portion of the social networking website that is associated with a user of the first computing device.

15. The server of claim 6, further comprising a user page module stored in the memory and executable by the one or more processors to automatically post at least some of the contents of the communication on a portion of a host site that is associated with a user of the first computing device.

16. Computer-readable storage media storing computer-readable instructions that, when executed by a processor, cause the processor to perform operations comprising:
    receiving, from a user, a selection identifying text in an e-book;
    receiving, from the user, a request to send a communication to a second computing device, the communication to include:
        an audio file of a person associated with the e-book reading the selected text aloud; and
    sending the request to a server that hosts an audio book corresponding to the e-book, the request instructing the server to send the communication to the second computing device.

17. The computer-readable storage media of claim 16, wherein the computer-readable instructions are further executable by the processor to perform operations comprising:
    receiving, from the user, annotations associated with the selected text in the e-book; and
    including the annotations in the request to the server.

18. The computer-readable storage media of claim 16, wherein the computer-readable instructions are further executable by the processor to perform operations comprising:
    receiving, from the user, a greeting to a recipient of the communication; and
    including the greeting in the request to the server.

19. The computer-readable storage media of claim 16, wherein the request to the server includes the selected text.

20. The computer-readable storage media of claim 16, wherein the request to the server includes data identifying the selected text.

21. Computer-readable storage media storing computer-readable instructions that, when executed by a processor, cause the processor to perform operations comprising:
    receiving a communication from a server, the communication including;
    multimedia data that enables access to a portion of multimedia content corresponding to text selected from an e-book, and
        an acquisition hyperlink to enable acquisition of the e-book and items associated with the e-book;
    receiving, from a user, a selection to access the portion of the multimedia content via the multimedia data;
    accessing the portion of the multimedia content; and
    playing back the portion of the multimedia content.

22. The computer-readable storage media of claim 21, wherein the communication includes text data that enables access to the text selected from the e-book.

23. The computer-readable storage media of claim 22, wherein the text data comprises a hyperlink.

24. The computer-readable storage media of claim 21, wherein the operations further comprise:
    receiving, from the user, a request to acquire one or more of the e-book, an extended version of the multimedia content, an audio book, or a printed book; and
    sending the request to the server.

25. The computer-readable storage media of claim 24, wherein the operations further comprise receiving, from the server, one or more of the e-book, the extended version of the multimedia content, the audio book, or the printed book.

* * * * *